United States Patent [19]

Scherrer

[11] 3,992,881
[45] Nov. 23, 1976

[54] APPARATUS TO GENERATE HIGH PRESSURE AIR FROM WATER

[76] Inventor: William A. Scherrer, 6700 Alvina St., Bell Gardens, Calif. 90207

[22] Filed: Aug. 25, 1975

[21] Appl. No.: 607,685

[52] U.S. Cl. .................................. 60/398; 60/530; 60/531; 60/670
[51] Int. Cl.² .................... F15B 11/06; F15B 21/00
[58] Field of Search ............. 60/325, 326, 327, 398, 60/530, 531, 670

[56] References Cited
UNITED STATES PATENTS

| | | | |
|---|---|---|---|
| 3,163,985 | 1/1965 | Bouyoucos | 60/398 |
| 3,595,012 | 7/1971 | Beck | 60/398 X |
| 3,677,008 | 7/1972 | Koutz | 60/359 X |
| 3,895,493 | 7/1975 | Rigollot | 60/398 X |

*Primary Examiner*—Edgar W. Geoghegan

[57] ABSTRACT

A water holding tank is placed at a substantial water depth. Two water valves and an air valve are on the tank. A conduit leads from the tank to the surface atmosphere. A second embodiment of the invention includes a hollow cannister member placed at a substantial water depth and has a filter with walls of material permeable to dissolved air but not liquid water. A conduit leads from the cannister member to the surface atmosphere. There is a regulating valve in the conduit.

Gas pressure driven prime movers, cooling condensers or air liquifier nozzle extensions connect to the said conduits.

15 Claims, 8 Drawing Figures

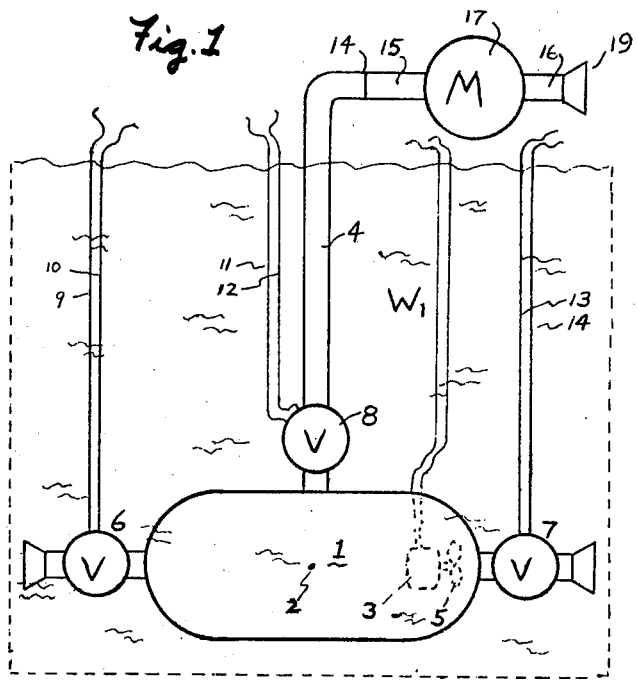
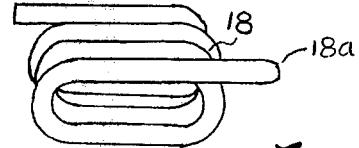
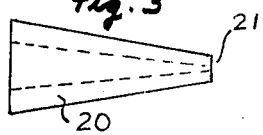
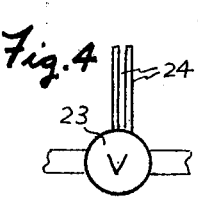
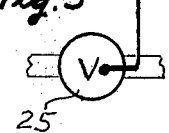
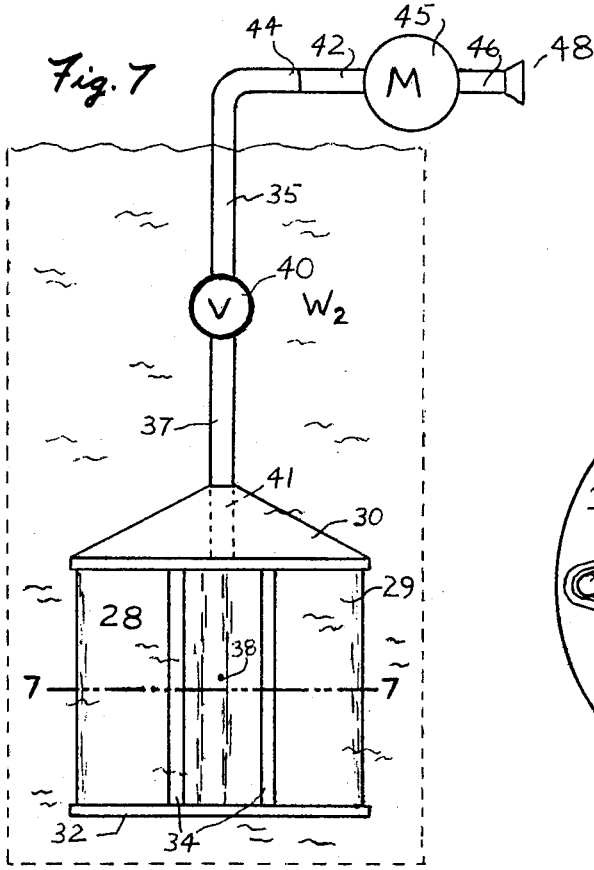
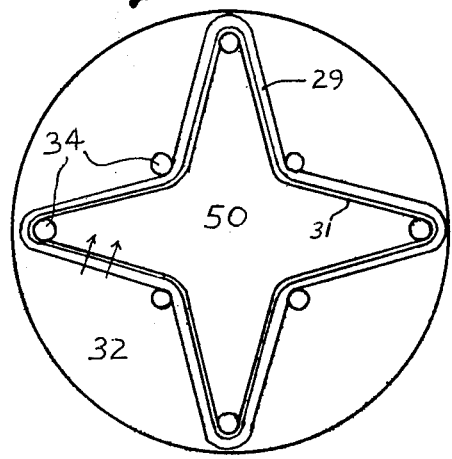

APPARATUS TO GENERATE HIGH PRESSURE AIR FROM WATER

FIELD OF THE INVENTION

The present invention relates to apparatus to generate high pressure air and subsequently produce energy from water.

BRIEF SUMMARY OF THE INVENTION

In essence my invention is an apparatus to generate high pressure air and subsequently produce energy by extracting air initially dissolved in water. In the first preferred embodiment it includes a water holding tank placed at a substantial depth of water and a conduit leading from the water holding tank to the surface. There is an air valve on the holding tank between the tank and the conduit, and two water valves on the tank leading to the exterior of the tank and surrounding water. The operational cycle of this apparatus includes two phases. In the first phase the air valve is closed and the two water valves are open, whereupon high pressure water enters into the holding tank through the water valves. In the second phase of the cycle the water valves are closed and the air valve soon after is opened, whereupon then the water enclosed in the tank releases high pressure air into the conduit. The conduit is connected to a prime mover (motor) at the surface, and the prime mover is driven by the high pressure air generated by the tank.

The second preferred embodiment of my invention uses a hollow cannister member placed at a substantial depth of water, and has a filter comprising pleated walls of material which is permeable to air but not permeable to liquid water. The cannister is connected to a conduit which leads to the surface of the water. At the surface the conduit connects to a prime mover. There is a regulating valve in the conduit leading to the prime mover.

In the operation of this second preferred embodiment dissolved air present in the water flows through the permeable material of the filter into the interior hollow part of the hollow cannister member, due to the pressure in the hollow interior of the cannister member being somewhat less than the pressure of the surrounding water. The air flows from the water through the filter and then into the interior hollow part of the hollow cannister member. The high pressure air then flows from the interior hollow part of the hollow cannister member through the conduit and to the prime mover where the high pressure air drives the prime mover. The operation of this second preferred embodiment is continuous and is regulated or turned off only by the regulating valve in the conduit.

In place of the prime movers, cooling coil sections, or gas liquifier sections as extensions to the conduit may be used.

It is therefore a chief object of my invention to provide apparatuses that produce a flow of high pressure air from seas or other water bodies which may be used to produce non-polluting energy.

It is another object of my invention to provide apparatuses that produce a flow of high pressure air from seas or other water bodies which may be used for other purposes.

These and other objects of my invention will be apparent in the following specification and drawings of which:

BRIEF DESCRIPTION OF THE DRAWINGS

FIG. 1 is a side view of the first embodiment showing the tank apparatus in water, the conduit, and the prime mover attached.

FIG. 2 is a view of the cooling coil conduit section.

FIG. 3 is a view of the gas liquifier conduit section.

FIG. 4 is a view of a modification of a valve of the apparatus of FIG. 1.

FIG. 5 is a view of another modificaton of a valve of the apparatus of FIG. 1.

FIG. 6 is a view of a modification to the conduit.

FIG. 7 is a side view of the second preferred embodiment showing the hollow cannister member in water, the conduit, and the prime mover.

FIG. 8 is a sectional view taken through the cannister member along the line 7—7 of FIG. 7.

DESCRIPTION OF THE PREFERRED EMBODIMENTS

Referring now to FIG. 1 the first preferred embodiment has a hollow holding tank 1, which is placed in a water body $W_1$ (represented by the water within dashed border lines) at a substantial water depth. The water depth specifically is that depth below the upper surface of the water body $W_1$ to the geometrical midpoint 2 of the tank 1, and is preferably 150 feet or more. On one side of the tank 1 is an electrically operated water valve 6 which valves the interior of the holding tank 1 to the exterior where there is high pressure water. On the opposite side of the tank is another electrically operated water valve 7 valving the interior of the holding tank 1 to the exterior also. On the top of the tank there is an electrically operated air valve 8. The air valve 8 connects the interior of the tank 1 to the interior of the first section 4 of a hollow conduit 4, 15, and 16 which leads to the upper surface of the water and slightly above. The terminal end 19 of the whole conduit then is in the atmosphere where the atmospheric environment has a low natural pressure (air) of 14.7 pounds per square inch at sea level.

Wires 9, 10 connected to valve 6; wires 11 and 12 connected to valve 8; and wires 13 and 14 connected to valve 7 lead to the surface allowing control of the valves by electrical signals from an electrical source (not shown) above the surface.

The principle of the apparatus relies on the fact that dissolved air exists in water usually throughout its entirety and for a given element of water the dissolved air exists at the same pressure as the element of water. Dissolved air will be be released from an element of high pressure water, much the same as uncapping a bottle of soda releases its dissolved $CO_2$, when the water element is exposed to a lower pressure environment. In the operation of the apparatus an element of water at considerable depth and therefore at high ressure is isolated in the tank 1 by the valves 6 and 7. When next exposed by the air valve 8 to the somewhat lower pressure air in the conduit 4, the element of water releases its dissolved air.

The operational cycle of this apparatus takes place in two phases. In the first phase of the cycle air valve 8 is closed and water valves 6 and 7 are opened. The two valves 6 and 7 opened simultaneously allow cross flow of water through the interior of the tank 1 and this causes rapid water replacement in the interior of the tank 1. Natural water currents and diffusion aid the process and a new element of air laden water flows into the tank.

After the tank 1 has been filled with the new element of water the second phase of the cycle begins. During this second phase of the cycle, water valves 6 and 7 are closed thereby isolating the element of water in the interior of the tank. Soon after, air valve 8 is opened. Now the dissolved air in the element of water is released as the element is exposed via the air valve 8 to the somewhat lower pressure air in the conduit 4. Consequently the released air leaves the water and enters into the conduit 4 at a pressure that is lower than that of the water surrounding the tank 1 but much greater than atmospheric pressure. After the air has been released, the cycle is completed; valve 8 closes, then a new cycle begins. The two phase cycle will thenafter be continuously repeated to produce a flow of high pressure air from the apparatus.

The high pressure air thus generated flows through the sections 4 and 15 of the conduit to the prime mover 17 and it thereby drives the prime mover 17. The air then flows out through the final section 16 of the conduit which also serves as the outlet of the prime mover, and the spent air finally outlets (exits) from the terminal end 19 of the conduit into the atmosphere environment of low natural pressure.

The second preferred embodiment is shown in FIG. 7 and FIG. 8. This embodiment has a hollow cannister member 28 which is placed in a water body $W_2$ (represented by the water within the dashed border lines) at a substantial water depth — the water depth specifically being that depth below the upper surface of the water body $W_2$ to the geometrical midpoint 38 of the cannister member 28. The water depth of the cannister member is preferably 50 feet or more.

The cannister member 28 has a solid bottom plate 32 and a funnel-shaped top plate 30 with an outlet aperture 41 in the uppermost part of the top plate. Vertical rods 34 circularly spaced about the cannister as shown in FIG. 8 are affixed to the bottom plate 32 and to the top plate 30. Forming the walls of the cannister 28 is a filter 29 made of material, such as for example certain plastics, which has the characteristic of being permeable to air but not to liquid water. The filter 29 has one side exposed to liquid water and the other side exposed to the interior hollow part of the cannister member. The filter 29 is formed in a star-like pattern, shown in FIG. 8, weaving around the rods 34 so as to form pleats that greatly increase the total surface area of the filter 29. The filter material is affixed by adhesive or by clamping structure to the top plate 30 and the bottom plate 32, forming with the top and bottom plates a walled enclosure surrounding the interior hollow part 50 of the cannister member.

Backing the filter material and also woven around the rods 34 is a screen 31 made of strong material such as metal, which adds strength to the material so as to sustain high pressure water pushing inward on the filter material. This screen 31 does not interfere except to an insignificant degree with the flow of air through filter material.

Connected to the top plate 30 of the cannister above the outlet aperture 41 is a hollow conduit comprising of four parts 35, 37, 42 and 46. The conduit leads from the hollow cannister member 28 to the surface and slightly above the water with the terminal end 48 of the conduit being in the atmosphere of low natural pressure of 14.7 pounds per square inch at sea level. There is a regulating valve 40 in the conduit between the two sections 35 and 37 of the conduit. And a prime mover 45 has its inlet conduit section 42 connected to the end of the conduit, with the outlet conduit section 46 of the prime mover outletting to the atmosphere.

The operation of this second preferred embodiment relies on the principle that when air pressure on one side of the filter 29 is less than the pressure of air laden water on the other side of the filter, dissolved air will flow out of the water, through the filter material and finally to the other side of the filter to the interior hollow part 50 of the cannister member where there is lower pressure air. Pressure within the interior of the cannister member is kept somewhat lower than the pressure of the water surrounding the cannister member so that there is a steady flow, and this is achieved simply by having some apparatus at the end of the conduit, such as the prime mover, which uses and outlets the air to low pressure atmosphere. Consequently air flows from the water through the material of the filter 29 and then into the interior hollow part 50 of the cannister where there is air only.

The air entering the interior hollow part 50 of the cannister member 28 is at a pressure lower than the surrounding water but much greater than atmospheric pressure. This air flows from the cannister interior hollow part 50 through the aperture 41 and into the first section 37 of the conduit, then through valve 40, and the next section 35 of conduit and into section 42 of the conduit which also is the inlet to the prime mover 45. The air upon reaching the prime mover 45, drives the prime mover; and finally the air outlets the terminal end 48 of the conduit into the atmosphere environment of low natural pressure.

The energy, i.e. the work, produced by the prime mover can be used for mechanical purposes, or to drive a generator to produce electrical energy.

In this second embodiment the air flow produced is continuous. It can be shut off by the regulating valve 40, or this valve 40 will provide a means to regulate the amount of air flow through the conduit, as it is a fully adjustable valve.

With either the first or second embodiments described the only byproduct of these apparatuses is fresh air which is readmitted into the atmosphere where it originated. Furthermore the source of energy, dissolved air in water bodies, is continuously self-replenishing due to the constant natural dissolving of air into water and at present energy consumption rates is apparently inexhaustible as an energy source. The two preferred embodiments provides means to use this natural, self-replenishing and non-polluting source of energy from any water body. And the water body may be ocean, smaller sea, lakes or even deep rivers, and I will place no restriction on my invention on the type of water body to be used.

My invention may admit of many modifications. For example, instead of using electrically operated valves on the tank of the first embodiment, hydraulically operated valves such as the hydraulically operated valve 23 fitted with hydraulic lines 24 shown in FIG. 4, may replace any or all of the valves of the first embodiment. Or the valves used in the first embodiment may be mechanically operated valves such as valve 25 shown in FIG. 5, with a rod or wire leading to the surface to operate the valve. Such a mechanically operated valve as 25 may also replace any or all of the valves described in the first embodiment.

An electric motor 3 with a propeller 5 adjacent to one valve opening, such as for valve 7, can be used to aid the flow of water into the tank 1.

Other uses may be made of the high pressure air flowing from either of the apparatuses. For example if the tank 1 or cannister member 28 were placed at a very great depth and consequently produced very high pressure air, an air liquifier conduit section 20 having a very restricted terminal end 21, could replace the prime mover 17 and conduit sections 15 and 16 of FIG. 1; or the gas liquifier conduit extension could replace the prime mover 45 and conduit sections 42 and 46 of FIG. 7. In operation this gas liquifier conduit section 20 would directly liquify gas or air outletting from it to the atmosphere due to the extreme expansion and cooling of some of the gas or air that occurs at the very restricted terminal end 21 of the section.

Or as another example, a cooling coil conduit section 18 shown in FIG. 2 could replace the prime mover 17 and conduit sectons 15 and 16 of FIG. 1 forming in effect a different type extension to the conduit. The cooling coil conduit section 18 could likewise replace the prime mover 45 and conduit sections 42 and 46 of FIG. 7.

The cooling coil conduit section 18 has high heat transferring walls to perform its function of extracting heat from the environment immediately surrounding the coil 18 as air expands and cools within the section 18. The air thereafter outlets through the terminal end 18a of the cooling coil conduit section.

When using prime movers connected to the conduits of the first or second embodiments it is best that the conduits 4 or 35, 37 respectively are made of material that is highly heat transferring so that with any expansion of air in the conduits heat is picked up from the water surrounding the conduits and the expansion of the air in the conduit is as near isothermal as possible. This provides the most energy to drive the prime movers when the air reaches them.

On the other hand when the cooling coil conduit section 18 or gas liquifier conduit section 20 are used in place of the prime movers it is best to substitute heat insulated conduit sections for the conduits 4, or 35, 37. Such a heat insulated conduit is shown in FIG. 6 and comprises an inner conduit 26 surrounded by thermal insulating material 27, such as for example foam plastic. Using such a heat insulated conduit insures that any expansion of air within the conduit is close to adiabatic, whereby the air in this case is advantageously precooled before it reaches the gas liquifier conduit or the cooling coil conduit.

The prime movers used in the first or second embodiments of my invention also may be advantageously "warmed" by water jacketing through which water from the water body flows or by submerging the prime movers in the water body. The prime movers 17 or 45 used may be positive displacement motors, or turbine, or hybrid and I will therefore place no restriction on my invention in the type of prime mover to be used.

The cannister member of the second preferred embodiment may be of any convenient shape such as spherical, cylindrical, square, etc. and many different shaped hollow members having walls or at least a part of one wall being the filter, and made of material permeable to dissolved gas or air but not liquid water, can be used in my invention.

The material used for the walls of the cannister member or other hollow member may be permeable to only one gas, to water vapor, or to a mixture of gases other than complete air and would still be workable generally as described.

The filter material used for the walls of the cannister or other hollow member may have the characteristic that dissolved gas will flow through the material even through pressure within the cannister is not substantially lower than the pressure of the exterior water, so that a higher working air pressure within the interior of the cannister can be used.

A body of some liquid other than fresh water or salt water, which retains dissolved gas could be used in place of the water bodies $W_1$ or $W_2$.

The cannister member can be combined with the conduit in such a way that they are the same body, such as for example having filter material walls directly in the conduit. In this case the conduit itself is also the hollow member.

And while in the preferred embodiments the conduits lead all the way to the surface of the water it is not strictly necessary that the conduits go all the way to the surface. The conduits could in fact lead only to another part of the water substantially higher than the level of the tank 1 or cannister 28, with air outletting into water at a higher elevation (therefore at lower natural pressure) after passing through a prime mover, cooling coil, or other apparatus. All that is essential in my invention is that the conduit leads to an environment of lower natural pressure than the pressure at the water depth of the tank 1 or cannister member 28. By environment of lower natural pressure I mean a place of the earth where the combined fluid pressure — the hydrostatic pressure of any liquid present plus the atmospheric pressure is lower. Such an environment of lower natural pressure could be the atmosphere solely or could be a region of water at a depth less than the water depth of the tank 1 in the first embodiment, or of the cannister member 28 in the case of the second embodiment. As an example the water depth of the cannister member could be as little as twenty feet and the depth of the terminal end of the conduit could be ten feet, and the apparatus would still be workable; in such case air would re-enter the water at a higher level.

Also while in the preferred embodiment the level of the terminal ends of the conduits is much higher than the water depth of the tank 1 or the water depth of the cannister member 28 it is possible that the terminal ends of the conduits be at the same level or even at a lower level than the tank 1 or cannister member 28 and still outlet to an environment of lower natural pressure. Such a case would be when the tank 1 or cannister member 28 were placed on the water side of a water dam and the terminal end of the conduit was at the other side of the water dam where there is low natural atmospheric pressure. Or another example would be where the tank 1 or cannister member 28 were at a greater water depth in a high water body (such as a lake at high elevation) and the terminal end of the conduit was in a lesser depth of a lower elevation water body (such as in a shallow part of a lake at a lower elevation).

It is to be understood that when a prime mover is used in my invention and has no outlet conduit section connected to the outlet then the outlet aperture of the prime mover constitutes the terminal end of the conduit.

Finally the air generated by the apparatuses could be used for other applications which in most cases would involve other conduit extension sections, such as for example to directly aerate a pond, or to aerate soil, or for pneumatic cleaning.

These and still other modifications fall within the scope of my invention.

I claim:

1. An apparatus to generate higher than atmospheric pressure gas from water, said apparatus comprising a water holding tank placed at a substantial water depth; a conduit leading from said water holding tank to an environment of lower natural pressure than the pressure at said water depth; a first valve valving the interior of the said water holding tank to the tank's exterior; a second valve valving the interior of the said water holding tank to the interior of the said conduit; a third valve valving the interior of the said water holding tank to the said tank's exterior, the said first valve and the said third valve adapted to in combination allow rapid replacement of water within the interior of the said water holding tank.

2. An apparatus to generate higher than atmospheric pressure gas from water, said apparatus comprising a water holding tank placed at a substantial water depth; a conduit leading from said water holding tank to an environment of lower natural pressure than the pressure at said water depth; a first valve valving the interior of the said water holding tank to the tank's exterior; and a second valve valving the interior of the said water holding tank to the interior of the said conduit, said apparatus operable on a repeated two phase cycle wherein during the first phase the said first valve is open and the said second valve is closed so that a charge or air laden water enters said water holding tank, and during the second phase the said first valve is closed and the said second valve is open whereby the charge of air laden water is isolated in the said water holding tank and the charge of air laden water releases dissolved air into the said conduit.

3. An invention according to claim 1, said conduit's terminal end being in the atmospheric environment.

4. An apparatus to generate higher than atmospheric pressure gas from water, said apparatus comprising a water holding tank placed at a substantial water depth; a conduit leading from said water holding tank to an environment of lower natural pressure than the pressure at said water depth; a first valve valving the interior of the said water holding tank to the tank's exterior; and a second valve valving the interior of the said water holding tank to the interior of the said conduit, said apparatus operable on a repeated cycle which includes two phases, wherein during the first phase the said first valve is open and the said second valve is closed so that a charge of gas laden water enters said water holding tank, and during the second phase the said first valve is closed and the said second valve is open whereby the charge of gas laden water is isolated in the said water holding tank and the charge of gas laden water releases dissolved gas into the said conduit.

5. An invention according to claim 4 with said conduit's terminal end being in the atmospheric environment.

6. An invention according to claim 4 and a prime mover connected to the said conduit.

7. An apparatus to generate higher than atmospheric pressure gas from water, said apparatus comprising a hollow member; and a filter comprising material permeable to water vapor but impermeable to liquid water, said filter having one side exposed to the hollow part of said hollow member and another side exposed to liquid water; with said hollow member and said filter placed at a substantial water depth; a conduit leading from said hollow member to an environment of lower natural pressure than the pressure at said water depth, with the interior of the said conduit adapted to communicate with the interior hollow part of said hollow member, whereby during the operation of said apparatus water vapor flows from the water through said filter and then into the interior hollow part of said hollow member, and from the interior hollow part of said member into the interior of said conduit and toward the said environment of lower natural pressure.

8. An invention according to claim 7, said conduit's terminal end being in the atmosphere.

9. An apparatus to generate higher than atmospheric pressure gas from water, said apparatus comprising a hollow member; and a filter comprising material permeable to dissolved gas in water but impermeable to liquid water, said filter having one side exposed to the hollow part of said hollow member and another side exposed to liquid water; with said hollow member and said filter placed at a substantial water depth; a conduit leading from said hollow member to an environment of lower natural pressure than the pressure at said water deth, with the interior of the said conduit adapted to communicate with the interior hollow part of said hollow member, whereby during the operation of said apparatus dissolved gas in water flows from the water through said filter and then into the interior hollow part of said hollow member, and from the interior hollow part of said member into the interior of said conduit and toward the said environment of lower natural pressure.

10. An invention according to claim 9, said conduit's terminal end being in the atmosphere.

11. An invention according to claim 9 and a prime mover connected to the terminal end of said conduit, said prime mover being driven by gas generated by the said apparatus.

12. An invention according to claim 9, said environment being at a substantially higher level than the level of said water depth of said hollow member, and a valve in the said conduit to regulate the flow of gas generated by the said apparatus.

13. An invention according to claim 9, said water depth being not less than 20 feet below the upper surface of a given water body, and the terminal end of the said conduit being at a level at least as high or higher than ten feet below the upper surface of said given water body.

14. An invention according to claim 9, said water depth being at least 30 feet below the upper surface of a given water body, and the terminal end of said conduit being at a level at least as high or higher than twenty feet below the upper surface of said given water body.

15. An invention according to claim 9 with the terminal end of said conduit being at a level at least as high or higher than 10 feet higher than the said substantial water depth of said hollow member and said filter.

* * * * *